Patented Mar. 23, 1948

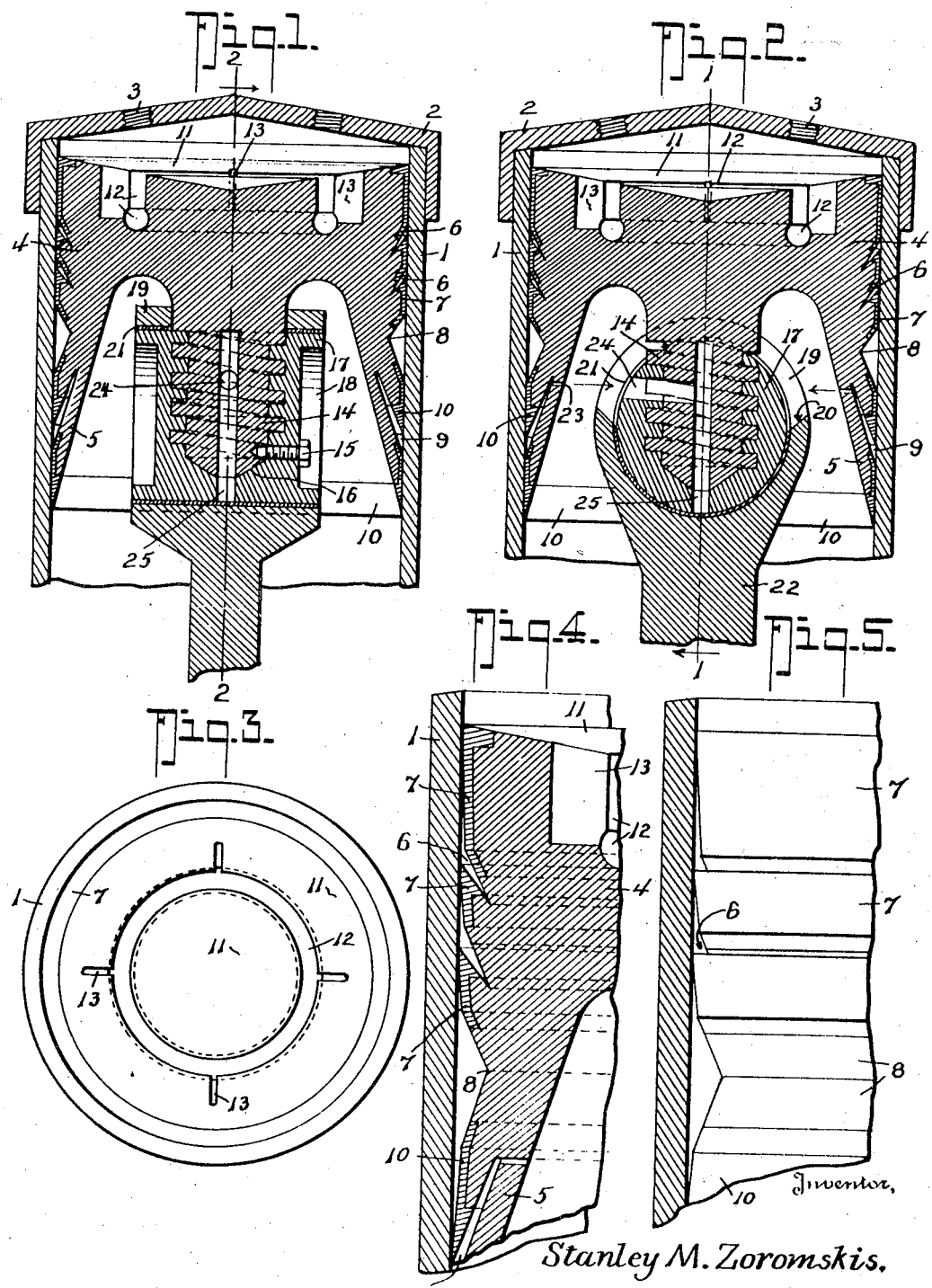

2,438,243

UNITED STATES PATENT OFFICE 2,438,243

INTERNAL-COMBUSTION ENGINE PISTON

Stanley M. Zoromskis, Kenosha, Wis.

Application October 20, 1944, Serial No. 559,549

7 Claims. (Cl. 309—14)

My invention, which relates generally to internal combustion engines, has particular reference to the pistons thereof.

Primarily the invention has for an object to provide an improved construction of piston which enables the piston to hold and retain the greatest amount of compression with the least amount of friction and wear on the cylinder walls.

Another object is to provide the piston with means whereby danger of warped pistons and scorched piston and cylinder walls will be eliminated or reduced to a minimum.

Further it is an object to provide means to relieve excessive internal head expansion pressure in the event that the piston head is overheated and has expanded to the cylinder wall.

A further object is to provide a piston with its head so constructed as to prevent the escape of the products of combustion at the head of the piston and to center the forces of the combustion so that the greatest force will be applied to the center of the piston or, in other words, along the longitudinal axis of the piston, thereby to produce smoother power transmission and less loss of compression.

Again it is an object to provide a piston with a circular groove in its top for the purpose of expanding the piston head at the instant of combustion.

A still further object is to provide a piston with V-shaped grooves in its outer walls, thereby providing two or more compression prongs and two or more oil prongs, and to provide these prongs with slippers of beryllium-copper alloy, forming continuous bands around the piston body, the latter being made, preferably, of aluminum, or aluminum alloy.

Another object is to provide a piston with a threaded extension, to receive the wrist pin, which is of an unusually large size and to provide a connecting rod bearing of large bearing surface to ensure long life of the wrist pin and connecting rod assembly.

Yet another object is to provide an effective simple means to lubricate the wrist pin.

Other objects will in part be obvious and in part be pointed out hereinafter.

To the attainment of the aforesaid objects and ends, the invention further resides in those novel details of construction, combination and arrangement of parts all of which will be first described in detail hereinafter and then be specifically pointed out in the appended claims, reference being had to the accompanying drawing in which:

Fig. 1 is a central vertical longitudinal section of a piston and cylinder and connecting rod assembly (parts being broken away) taken on the line 1—1 of Fig. 2.

Fig. 2 is a view similar to Fig. 1, taken on the line 2—2 of Fig. 1.

Fig. 3 is a top plan view of the parts shown in Fig. 1, with the cylinder head removed.

Fig. 4 is an enlarged detail vertical section showing the parts when cold, the taper of the slippers with respect to the cylinder wall being exaggerated for purposes of illustration.

Fig. 5 is a view similar to Fig. 4 showing the piston part in elevation.

In the drawing in which like numerals of reference indicate like parts in all the figures 1 represents the cylinder which may be constructed of the usual materials and which is preferably provided with a conical cylinder head 2 having spark plug receiving holes 3. The head may be secured to the cylinder in any approved way (not shown).

The body 4 of the piston is preferably constructed of aluminum or aluminum alloy and the skirt 5 is tapered down to a thin edge at the bottom. This long tapered skirt is used to wipe off the cylinder wall with its sharp edge, is beneficial in guiding the piston and is not interfered with by a wrist pin. The extra length reduces or prevents choppy wearing effect of egg-shaped cylinders caused by short pistons.

The outer wall of the piston is provided about midway its length with a relatively deep and wide V-shaped groove 8. That part of the piston above such groove has one or more narrow V-shaped grooves 6 extended inwardly-downwardly from the outer wall of the piston, forming prongs which are capped by slippers 7 of a relatively hard substance, preferably beryllium-copper. That part of the piston below the groove 8 has at least one narrow V-shaped groove 9 extended inwardly-upwardly from the outer wall of the piston, forming prongs which are capped by slippers 10. From an examination of the drawing it will be seen that the slippers constitute circular wedge shaped continuous bands (see Fig. 5).

The slippers 7 and 10 are swaged on under heat expansion, thus forming tight fitting continuous bands around the bodies of the prongs.

Under working conditions when the piston is hot, the aluminum bodies of the prongs will expand under sudden impact of the compression gases and will seal the compression off by pushing the prongs and slippers to the cylinder wall. The prongs have a small clearance at the heel (Figs. 4 and 5) to prevent scuffing on the downward stroke for the compression holding prongs and upward stroke for the oil prongs. Under working conditions, the prongs expand outward due to their shape. When the prongs are fully expanded, the side of the prong nearest the cylinder wall will be perfectly parallel with the cylinder wall (Figs. 1 and 2).

The piston head is provided with a conical-depressed face 11 and a relatively deep annular groove 12 leaving the peripheral top edge of the piston sharp. The sharp edge will separate the expanding gases from the cylinder wall more effectively than a blunt edge would and hence lesser forces will act to effect escape of gases past the piston. The conical surfaces of the piston head and the conical cylinder head tend to center the combustion force causing the greatest force to be exerted in the center of the piston along its axis. This gives smoother power transmission and less loss of compression.

The circular groove 12 in the top of the piston is provided for the purpose of expanding the piston head at the instant combustion starts. The expansion of the head will be caused by the expansion of the gases resulting from the combustion, and will seal off the escape of these gases between the piston and the cylinder walls. This expansion will continue as long as the internal pressure from the combustion gases is applied. Because of this system of expansion and the conical head design, there will be a much smaller loss of compression around the side of the piston head and a much greater amount of energy will be confined to do useful work at the top of the piston.

Should the piston become overheated and too great expansion of the head occur it will be relieved through the radial slots 13.

The head of the piston is provided with a threaded projection 14 within the confines of the skirt 5, to receive a wrist pin 17 having a threaded bore to fit the projection 14, the projection 14 and pin 17 having a tapered-seat joint as at 16. The wrist pin, after being inserted in the bearing 19 of the connecting rod 22 is screwed onto the projection 14 and locked thereto by the set screw 15 (Fig. 1). The connecting rod bearing 19 is provided with a suitable lining 21 for the wrist pin 17, the latter having recessed ends 18. The connecting rod is provided with oil dippers 20 while the projection 14 and wrist pin 17 have oil ducts 24, 25 for conveying oil to the bearing surface. One or more oil discharge ports 23 communicate with the oil groove 9 and shoot oil into duct 24 and against the exposed part of the wrist pin 17. The oil collected in oil groove 9 by the prong 10 of the piston on the down stroke is squirted under pressure across the space between the skirt 5 and the wrist pin. The oil duct 24, 25 and the dippers 20 constitute a two-way lubricating system for the wrist pin and connecting rod head.

From the foregoing description taken in connection with the accompanying drawing it is thought the construction, operation and advantages of my invention will be clear to those skilled in the art.

What I claim is:

1. In a piston for an engine having a cylinder, the improvement which comprises: a head portion; a skirt extending from the head portion and having an outer annular groove; said head portion having at least one inwardly-downwardly directed V-shaped annular groove in its outer side defining a prong; annular-band slippers on the outer face of said piston head and its prong; said skirt having at least one inwardly-upwardly directed V-shaped annular groove in its outer side defining a prong; annular band slippers on the outer face of said skirt and its prong.

2. In a piston for an engine having a cylinder, the improvement which comprises: a head portion; a skirt extending from the head portion and having an outer annular groove; said head portion having at least one inwardly-downwardly directed V-shaped annular groove in its outer side defining a prong; annular-band slippers on the outer face of said piston head and its prong; said skirt having at least one inwardly-upwardly directed V-shaped annular groove in its outer side defining a prong; annular band slippers on the outer face of said skirt and its prong, said slippers being composed of beryllium-copper alloy and the head and skirt of the piston being composed of a suitable softer metal.

3. In a piston for an engine having a cylinder, the improvement which comprises: a head portion; a skirt extending from the head portion and having an outer annular groove; said head portion having at least one inwardly-downwardly directed V-shaped annular groove in its outer side defining a prong; annular-band slippers on the outer face of said piston head and its prong; said skirt having at least one inwardly-upwardly directed V-shaped annular groove in its outer side defining a prong; annular band slippers on the outer face of said skirt and its prong; a downward projection coaxially with and projected from said head; a wrist pin secured to said projection and of less length than the internal diameter of said skirt; and a connecting rod having bearings to receive the ends of said wrist pin; said wrist pin and said projection having an oil duct for delivering lubricant to said bearings; and means operable on the inward stroke of the piston within the cylinder for squirting oil into said oil duct.

4. In a piston wherein there is provided a head portion, a skirt, and means for connecting a connecting rod directly to the head portion within the confines of and free of the skirt: the improvement which comprises the provision of an inner wall of the skirt which tapers from the head portion downwardly-outwardly to the outer face of the skirt at its bottom thereby to provide a knife edge at the bottom of the skirt; and the provision of at least one inwardly-downwardly directed V-shaped annular groove in the upper part of the outer wall of the piston, thereby defining a prong; and at least one inwardly-upwardly directed V-shaped annular groove in the lower part of the outer wall of the piston, thereby defining a prong, annular band slippers on the outer wall of the piston and extending part way into said V-shaped grooves.

5. The improved piston of claim 4 wherein said slippers are composed of a metal having a lower coefficient of expansion than that of the piston body.

6. The improved piston of claim 4 wherein the slippers are composed of beryllium-copper alloy and the remainder of the piston is composed of a suitable metal which is softer than said alloy.

7. The improved piston of claim 4 wherein the outer wall of the piston is provided with an inwardly directed V-shaped annular groove located at a place between the inwardly-downwardly directed annular groove and the inwardly-upwardly directed annular groove.

STANLEY M. ZOROMSKIS.

REFERENCES CITED

The following references are of record in the file of this patent:

UNITED STATES PATENTS

| Number | Name | Date |
|---|---|---|
| 1,020,836 | Moore | Mar. 19, 1912 |
| 1,224,999 | Barthel | May 8, 1917 |
| 1,267,963 | Benthall | May 28, 1918 |
| 1,294,833 | Ricardo | Feb. 18, 1919 |
| 1,320,064 | Junkers | Oct. 28, 1919 |
| 1,389,099 | Cook | Aug. 30, 1921 |
| 1,456,727 | Frenchi | May 29, 1923 |
| 2,040,032 | Steele et al. | May 5, 1936 |
| 2,221,535 | Berry | Nov. 12, 1940 |
| 2,295,199 | Carvelli | Sept. 8, 1942 |
| 2,344,416 | Scheibe | Mar. 14, 1944 |

FOREIGN PATENTS

| Number | Country | Date |
|---|---|---|
| 739,921 | France | Jan. 19, 1933 |